(12) United States Patent
Chae et al.

(10) Patent No.: US 10,691,224 B2
(45) Date of Patent: Jun. 23, 2020

(54) KEYBOARD HAVING LOCKING FUNCTION AND ELECTRONIC DEVICE COMPRISING THE SAME

(71) Applicant: Samsung Electronics Co., Ltd., Gyeonggi-do (KR)

(72) Inventors: Daesic Chae, Gyeonggi-do (KR); Myoungjun Choi, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 16/140,061

(22) Filed: Sep. 24, 2018

(65) Prior Publication Data

US 2019/0094985 A1 Mar. 28, 2019

(30) Foreign Application Priority Data

Sep. 26, 2017 (KR) .................. 10-2017-0124147

(51) Int. Cl.
*G06F 3/02* (2006.01)
*H01H 13/70* (2006.01)
*H01H 13/80* (2006.01)
*G06F 3/023* (2006.01)

(52) U.S. Cl.
CPC .......... *G06F 3/0219* (2013.01); *G06F 3/0238* (2013.01); *H01H 13/7013* (2013.01); *H01H 13/80* (2013.01); *H01H 2217/022* (2013.01); *H01H 2239/03* (2013.01)

(58) Field of Classification Search
CPC ... G06F 3/0219; H01H 13/7013; H01H 13/80
USPC .................................................. 200/5 A, 341
See application file for complete search history.

(56) References Cited

U.S. PATENT DOCUMENTS

| 4,188,136 A | 2/1980 | Bedocs |
| 6,211,475 B1 | 4/2001 | Ozaki |
| 6,257,782 B1 | 7/2001 | Maruyama et al. |
| 2003/0042123 A1 | 3/2003 | Chun |

(Continued)

FOREIGN PATENT DOCUMENTS

| JP | 2000-076956 | 3/2000 |
| JP | 2012-160428 | 8/2012 |

(Continued)

OTHER PUBLICATIONS

International Search Report dated Jan. 7, 2019 issued in counterpart application No. PCT/KR2018/011352, 3 pages.

*Primary Examiner* — Edwin A. Leon
*Assistant Examiner* — Iman Malakooti
(74) *Attorney, Agent, or Firm* — The Farrell Law Firm, P.C.

(57) ABSTRACT

A keyboard includes a circuit board comprising a contact terminal, a key cap, a housing comprising at least one key cap hole configured to penetrate the key cap, an elastic support member configured to support the key cap for moving the key cap and to press the contact terminal while the key cap moves in a downward direction, a link configured to guide an elevation movement of the key cap by connecting a first end of the link to the bottom of the key cap; a rotational support plate configured to be connected to a second end of the link and to rotate on the center of the elastic support member, and a fixing support plate comprising a circular groove configured to internally accommodate the rotational support plate.

20 Claims, 9 Drawing Sheets

(56) References Cited

U.S. PATENT DOCUMENTS

2010/0116629 A1\* 5/2010 Borissov .............. H01H 25/008
                                                                                    200/4
2012/0048700 A1\* 3/2012 Liu ....................... H01H 3/125
                                                                                     200/5 A
2012/0193202 A1 8/2012 Chen

FOREIGN PATENT DOCUMENTS

| KR | 10-1999-011508 | 2/1999 |
| KR | 1020030019813 | 3/2003 |
| KR | 1020080074444 | 8/2008 |
| KR | 20-2008-0005297 | 11/2008 |

\* cited by examiner

KEYBOARD HAVING LOCKING FUNCTION AND ELECTRONIC DEVICE COMPRISING THE SAME

CROSS-REFERENCE TO RELATED APPLICATION(S)

This application is based on and claims priority under 35 U.S.C. § 119 to Korean Patent Application No. 10-2017-0124147, filed on Sep. 26, 2017, in the Korean Intellectual Property Office, the disclosure of which is incorporated by reference herein in its entirety.

BACKGROUND

1. Field

The present disclosure relates generally to a keyboard having a locking function and an electronic device comprising the same.

2. Description of Related Art

Electronic devices such as a personal computer and a notebook computer can perform a function corresponding to an input received from a user. A typical input device in an electronic device is used for receiving an input from the user (i.e., a keyboard).

The keyboard can be connected to the electronic device in a wired or wireless manner. If one key cap (i.e., a button) of the keyboard is pressed by a user, the electronic device connected to the keyboard can receive an electric signal by using a circuit board located under the key cap and recognize a user input through the electric signal.

In some situations, a user may not want to generate a user input in an electronic device even though a key press is made on a key cap. For example, the user may want to lock at least one key (e.g., an end key) of the keyboard in a specific situation so that a program running in the electronic device cannot terminate or stop by unintentionally pressing a specific key of the keyboard while playing a game or preparing a document through the electronic device.

A method of changing a keyboard setting in software may be used to lock a specific key so that a user input will not be recognized even though an electric signal is received in an electronic device. Alternatively, a method of physically removing a key cap from the keyboard may be used so that the use input will not be recognized. However, an operating procedure that requires these methods is not intuitive and a restoring procedure to unlock a key may be cumbersome for a user.

SUMMARY

The present disclosure has been made to address the above-mentioned problems and disadvantages, and to provide at least the advantages described below.

In accordance with an aspect of the present disclosure, a keyboard includes a circuit board comprising a contact terminal, a key cap, a housing comprising at least one key cap hole configured to penetrate the key cap, an elastic support member configured to support the key cap for moving the key cap and to press the contact terminal while the key cap moves in a downward direction a link configured to guide an elevation movement of the key cap by connecting a first end of the link to the bottom of the key cap; a rotational support plate configured to be connected to a second end of the link and to rotate on the center of the elastic support member, and a fixing support plate comprising a circular groove configured to internally accommodate the rotational support plate.

In accordance with another aspect of the present disclosure, an electronic device includes a circuit board comprising a contact terminal, a key cap, a housing comprising at least one key cap hole configured to penetrate the key cap, an elastic support member configured to support the key cap for moving up the key cap and to press the contact terminal while the key cap moves in a downward direction, a link configured to guide an elevation movement of the key cap by connecting a first end of the link to the bottom of the key cap, a rotational support plate configured to be connected to a second end of the link and to rotate on the center of the elastic support member, and a fixing support plate comprising a circular groove configured to internally accommodate the rotational support plate.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

The electronic device of the present disclosure may be one of various types of electronic devices. The electronic devices may include, for example, a portable communication device (e.g., a smart phone), a computer device, a portable multimedia device, a portable medical device, a camera, a wearable device, or a home appliance. However, the electronic devices are not limited to those described above.

Various embodiments of the present disclosure and the terms used herein are not intended to limit the technological features of particular embodiments and may include various changes, equivalents, or replacements for a corresponding embodiment. With regards to the description of the drawings, similar reference numerals may be used to refer to similar or related elements. A singular form of a noun corresponding to an item may include one or more of the items, unless context clearly indicates otherwise.

As used herein, the expressions "A or B," "at least one of A and B," "at least one of A or B," "A, B, or C," "at least one of A, B, and C," and "at least one of A, B, or C," may include any and all combinations of one or more of the associated listed items. Terms as "1st" and "2nd," or "first" and "second" may be used to distinguish a corresponding component from another, and do not limit the components in importance or order. If an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may be interchangeably used with other terms, such as "logic," "logic block," "part," or "circuitry". A module may be a single integral component, or a minimum unit or part thereof, adapted to perform one or more functions. The module may be implemented in a form of an application-specific integrated circuit (ASIC).

Figure 1:
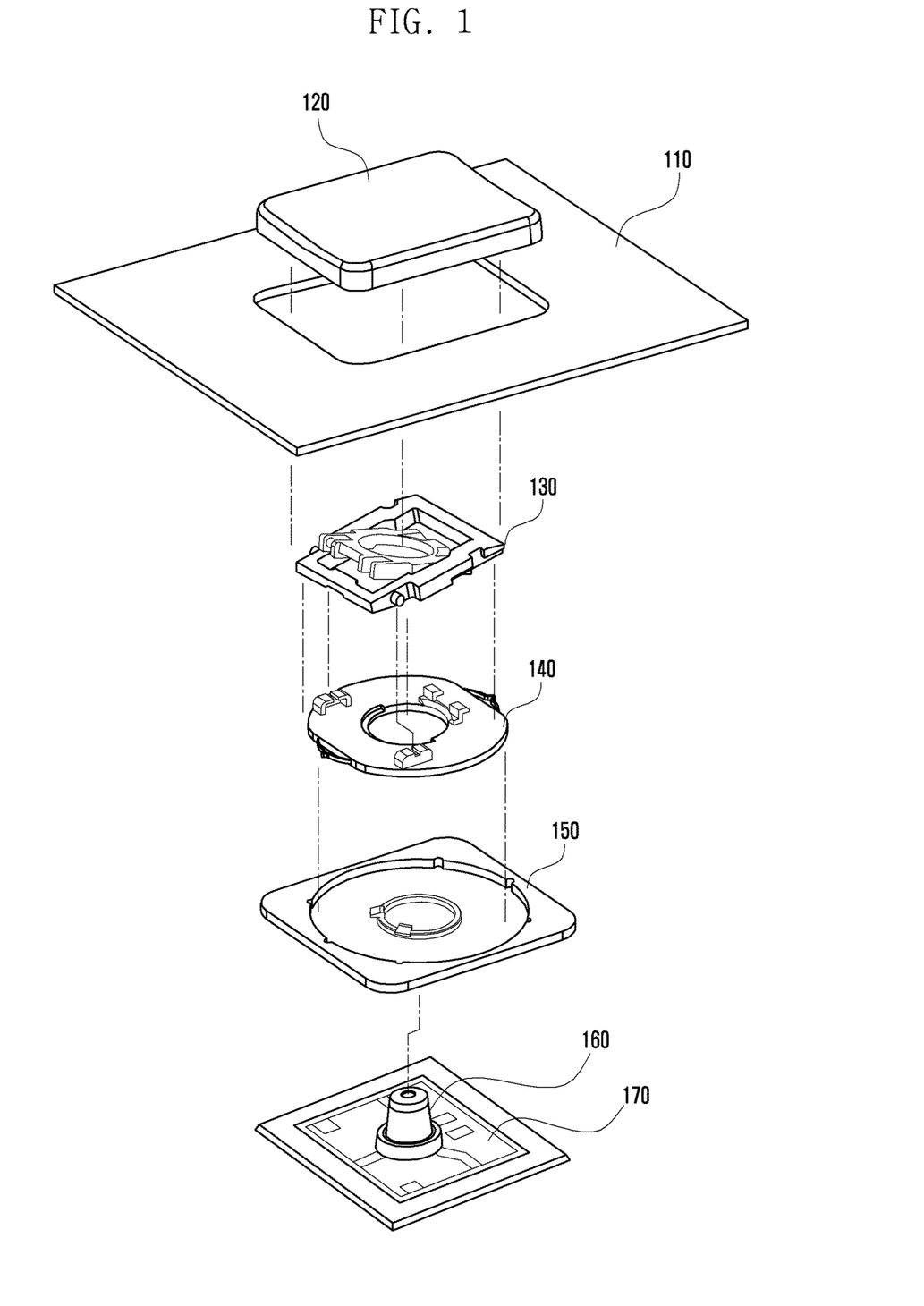
FIG. 1 is an exploded perspective view illustrating an electronic device, according to an embodiment.

FIG. 1 is an exploded perspective view illustrating an electronic device, according to an embodiment.

With reference to FIG. 1, a keyboard (i.e., an electronic device) includes a housing 110, a key cap 120, a link 130, a rotational support plate 140, and a fixing support plate 150.

The keyboard may be used as an input device for the electronic device. For example, if a specific key is pressed by a user, the keyboard can provide a pressure as input information by converting the pressure engaged on the key to an electric signal and transmitting the electric signal to the electronic device.

The keyboard includes a key cap 120, an elastic support member 160, and a contact terminal 170 corresponding to each key included in the keyboard.

The key cap 120 can be configured to perform an elevation movement in an upward direction and a downward direction. The elastic support member 160 may be disposed under the key cap 120 and the contact terminal 170 may be disposed under the elastic support member 160.

If the key cap 120 moves down (i.e., in a downward direction) according to a pressure invoked by a user, a contact signal can be applied to the contact terminal 170 through the elastic support member 160. The elastic support member 160 can use elastic power to move the key cap 120 up to a previous location before applying the pressure.

One end of the link 130 can be connected to the bottom of the key cap 120 in order to guide an elevation movement of the key cap 120. For example, the key cap 120 can perform an elevation movement within a specific height by connecting to the support plates 140 and 150 through the link 130.

Alternatively, the other end of link 130 can be connected to an upper part of the rotational support plate 140 provided for at least one key of the keyboard.

For example, by connecting an end of the link 130 (i.e., a first end of the link 130) to the key cap 120 and connecting the other end of the link 130 (i.e., a second end of the link 130) to the rotational support plate 140, the link 130 can guide the key cap 120 so that the key cap 120 can move in a specific height while being fixed to the rotational support plate 140.

The rotational support plate 140 is disposed at an upper part of the contact terminal 170, and can rotate on the center of the elastic support member 160 supporting the key cap 120 to move up.

Because the rotational support plate 140 is connected to the key cap 120 through the link 130, if a user rotates the key cap 120, the link 130 and the rotational support plate 140 connected to the key cap 120 can rotate together with the key cap 120 on the center of the elastic support member 160.

The keyboard may further include a fixing support plate 150 disposed at an upper part of the contact terminal 170.

The inside of the fixing support plate 150 may include a circular groove for accommodating the rotational support plate 140. The circular groove of the fixing support plate 150 may be formed corresponding to the shape of the rotational support plate 140 rotating on the center of the elastic support member 160. For example, the circular groove may be formed corresponding to the shape and size of the rotational support plate 140 so that the rotational support plate 140 can rotate without escaping from the circular groove.

Each of the link 130, the rotational support plate 140, and the fixing support plate 150 disposed under the key cap 120 may include a through hole corresponding to the elastic support member 160 so that the key cap 120 can press the contact terminal 170 through the elastic support member 160 when the key cap 120 moves down.

The keyboard may further include a housing 110 disposed on the contact terminal 170, the fixing support plate 150, and the rotational support plate 140 by covering them.

The housing 110 may include at least one key cap hole. The key cap 120 can move up and down by penetrating the housing 110 through the key cap hole included in the housing 110.

The key cap hole may be configured in a substantially polygon shape corresponding to the shape of the key cap 120. For example, the key cap 120 may have a substantially rectangular shape (e.g., square), and the key cap hole may be configured in a size slightly greater than the size of the key cap 120 corresponding to the shape of the key cap 120.

The key cap 120 can rotate on the center of the elastic support member 160 together with the link 130 connected to the key cap 120 and the rotational support plate 140 connected to the link 130.

If the key cap 120 rotates together with the link 130 and the rotational support plate 140, the fixing support plate 150 and the housing 110 can maintain a certain arrangement state regardless of the rotation.

If a user applies a force to the key cap 120 in the right or left direction, the key cap 120 can move in the direction of the applied force together with the link 130 and the rotational support plate 140.

For example, if the key cap 120 rotates to a specific angle in the right or left direction, the key cap hole of the housing 110 may not correspond to the shape of the key cap 120 anymore. If the user rotates the key cap 120 to a specific angle in the right or left direction in this manner, a key corresponding to the rotated key cap 120 cannot receive an input because the key cap 120 cannot move down through the key cap hole of the housing 110 anymore even though the user continues to press the key cap 120.

Accordingly, if the user does not want to receive an input from a specific key, the user can lock the key by rotating the key cap 120 to a specific angle in the right or left direction.

Figure 2A:
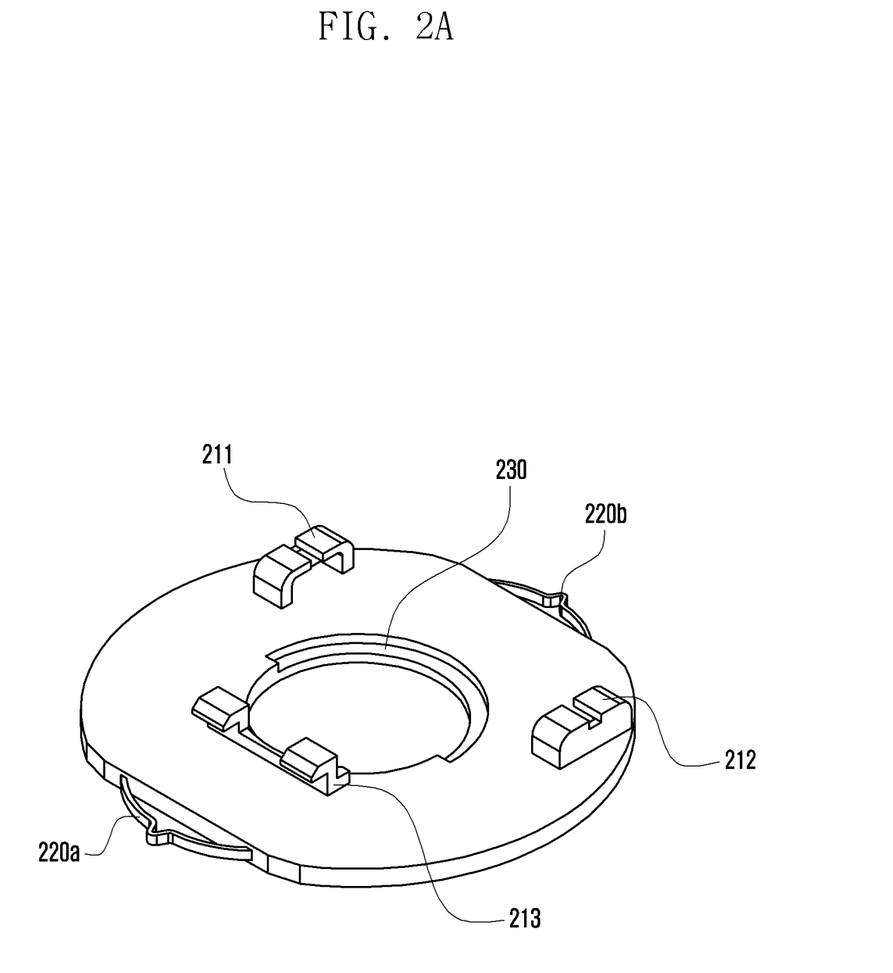
FIG. 2A is a perspective view of a rotational support plate, according to an embodiment.
Figure 2B:
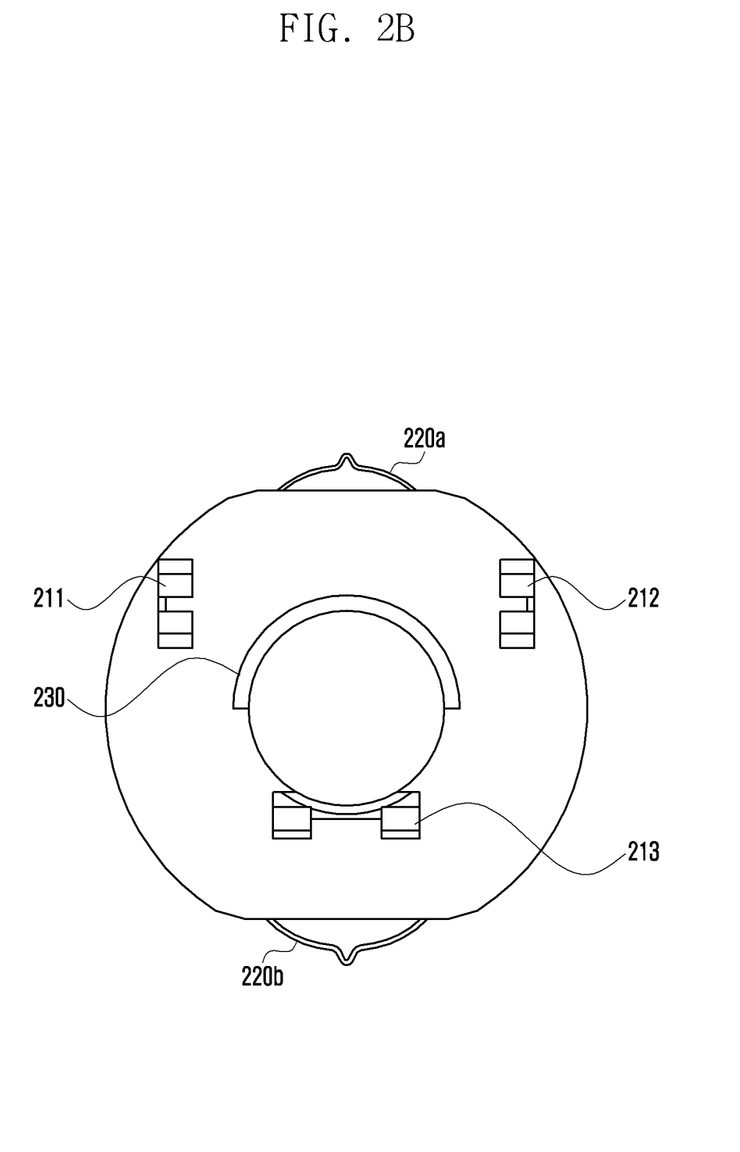
FIG. 2B is a top view of the rotational support plate of FIG. 2A, according to an embodiment.

FIGS. 2A and 2B illustrate a rotational support plate, according to an embodiment.

FIG. 2A is a perspective view of a rotational support plate, and FIG. 2B is a top view of the rotational support plate of FIG. 2A.

Referring to FIGS. 2A and 2B, the rotational support plate may correspond to the rotational support plate 140 of FIG. 1, and may be formed in a disk shape including a center hole.

The center hole may be an area penetrating the elastic support member 160 so that the elastic support member 160 can be connected from the contact terminal 170 located under the rotational support plate 140 to the key cap 120.

The rotational support plate 140 may include link holders 211, 212, and 213 for connecting the rotational support plate 140 to an end of the link 130 in order to guide an elevation movement of the key cap 120.

For example, the link holders 211, 212, and 213 can guide locations of the right, left, and height of the link 130 so that link 130 can be settled at a predetermined location on the rotational support plate 140.

The rotational support plate 140 may include at least one elastic member 220a and 220b at a side of the rotational support plate 140. The elastic members 220a and 220b may further include a plate spring. Two elastic members 220a and 220b may be included in the rotational support plate 140 by disposing each other in the opposite direction.

When the rotational support plate 140 is accommodated in the fixing support plate 150, the elastic members 220a and 220b may be accommodated at predetermined locations in a circular groove of the fixing support plate 150. For example, the elastic members 220a and 220b can be accommodated in at least one groove provided in the circular groove of the fixing support plate 150 and can be pressed up against by the grooves.

If the elastic members 220a and 220b are accommodated by the grooves according to a rotation of the rotational support plate 140, the elastic members 220a and 220b can limit a rotation of the rotational support plate 140 until a great enough force is applied to accommodate the elastic members 220a and 220b to escape from the grooves. For example, such a force may be greater than 300 gram-force (gf).

The rotational support plate 140 may further include a grooved area 230 to limit a rotation angle of the rotational support plate. For example, the grooved area 230 of the rotational support plate 140 may be formed at a specific height corresponding to a protrusion included in the fixing support plate 150.

The protrusion of the fixing support plate 150 may be configured not to escape from the grooved area 230 when rotating according to a difference between a height of the grooved area 230 and a height of a non-grooved area. Accordingly, the rotational support plate 140 may rotate only in the angle range formed in the grooved area 230. The grooved area 230 may include a range of 0 to 180 degrees.

Figure 3A:
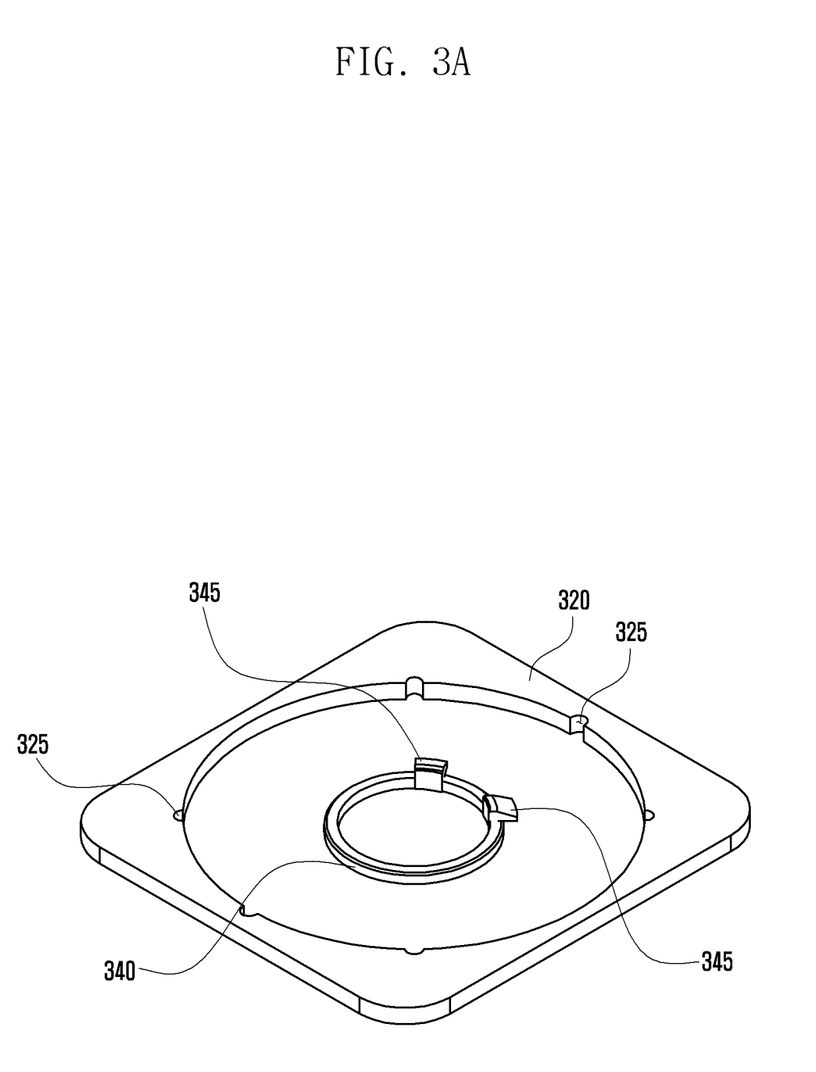
FIG. 3A is a perspective view illustrating a fixing support plate, according an embodiment.

FIG. 3A is a perspective view illustrating a fixing support plate (i.e., the fixing support plate 150 of FIG. 1), according an embodiment.

The fixing support plate 150 includes a circular groove in the center and accommodates a rotational support plate 140 so that the rotational support plate 140 can rotate in the circular groove.

Referring to FIG. 3A, the fixing support plate 150 includes a plurality of grooves 325 for accommodating elastic members 220a and 220b of the rotational support plate 140. The groove 325 may be formed corresponding to the shape of the elastic members 220a and 220b.

Adjacent grooves among the plurality of grooves 325 can be disposed at 45 degrees or 90 degrees based on an area penetrated by the center of the elastic support member 160.

For example, in a basic state in which the key cap does not rotate, the grooves 325 may be disposed at the upper and lower sides of the fixing support plate 150, if the key cap 120 and the fixing support plate 150 are viewed from the top side. More grooves 325 may be disposed at locations displaced as much as 45 degrees in the right and left directions from the center of the grooves 325 disposed at the upper and lower sides (i.e., corresponding to the elastic support member 160).

For example, the rotational support plate 140 can rotate up to 45 degree in the right or left direction from the basic state by disposing 6 grooves 325 on the fixing support plate 150 as shown in FIG. 3A.

The fixing support plate 150 may further include a protrusion 340 for limiting a rotation angle of the rotational support plate 140.

For example, the protrusion 340 can control the rotation angle of the rotational support plate 140 so that the rotational support plate 140 rotates only within the angle range of the grooved area 230 formed on the rotational support plate 140 and rotates no more in the angle range out of the grooved area 230 by a trapping jaw 345 of the protrusion 340.

As shown in FIG. 3A, the protrusion 340 can be configured such that two trapping jaws 345 are displaced from each other as much as 90 degrees.

The trapping jaws 345 may be also formed at locations displaced as much as 120 degrees in the right and left directions if the fixing support plate 150 is viewed from the top side in a state that the key cap 120 of the keyboard does not rotate. The trapping jaws 345 can be configured so that at least one of the trapping jaws 345 limits the rotation of the grooved area 230 when the key cap 120 rotates along the grooved area 230 of the rotational support plate 140. For example, the grooved area 230 of the rotational support plate 140 may be formed at a location where the rotational support plate 140 is caught by one of the trapping jaws 345 of the protrusion 340, if the rotational support plate 140 rotates 45 degrees in the right or left direction.

Figure 3B:
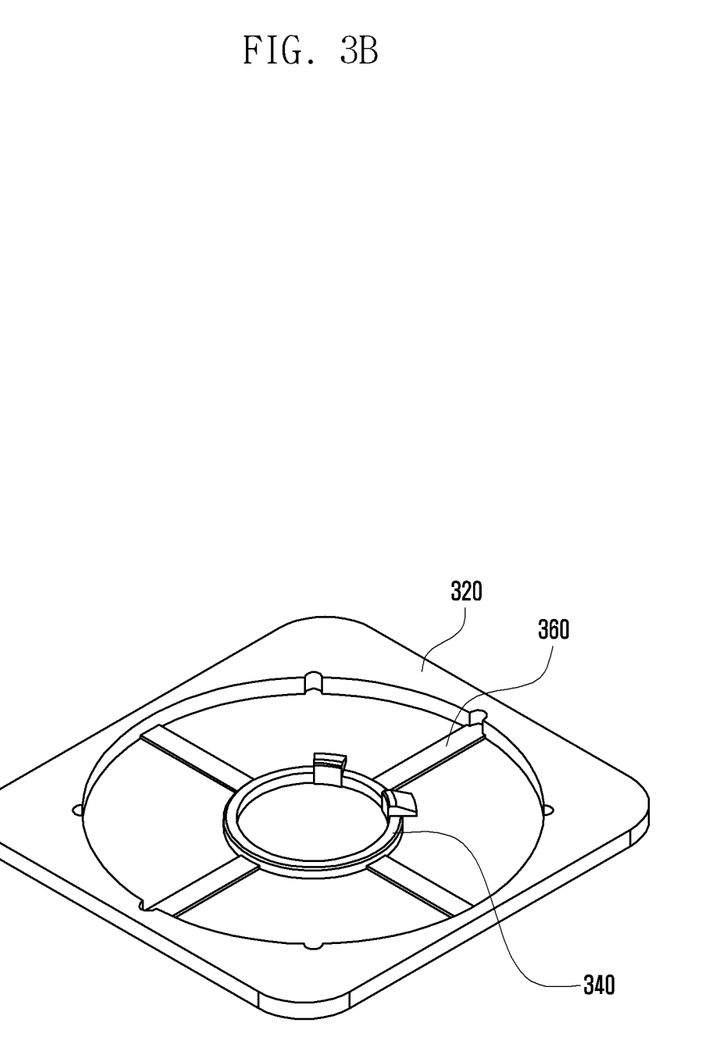
FIG. 3B is a perspective view illustrating a fixing support plate, according to an embodiment.

FIG. 3B is a perspective view illustrating a fixing support plate (i.e., the fixing support plate 150 of FIG. 1), according to an embodiment.

Referring to FIG. 3B, the fixing support plate 150 includes at least one connector 360 for connecting the body of the fixing support plate 150 and the protrusion 340 in a circular grooved area accommodating the rotational support plate 140.

The connector 360 may be formed with a thickness smaller than the thickness of the rotational support plate 140 so that the rotational support plate 140 may be accommodated in the circular groove of the fixing support plate 150.

The connector 360 may be formed in the whole area of the circular groove, or formed in a partial area of the circular groove as shown by FIG. 3B.

If the fixing support plate 150 includes a connector 360, manufacturing costs can be reduced because the body of the fixing support plate 150 and the protrusion 340 can be manufactured by one process without manufacturing them separately. Further, there is an advantage that a separate process of disposing the protrusion 340 is not required when disposing the fixing support plate 150 on a lower circuit board.

Figure 3C:
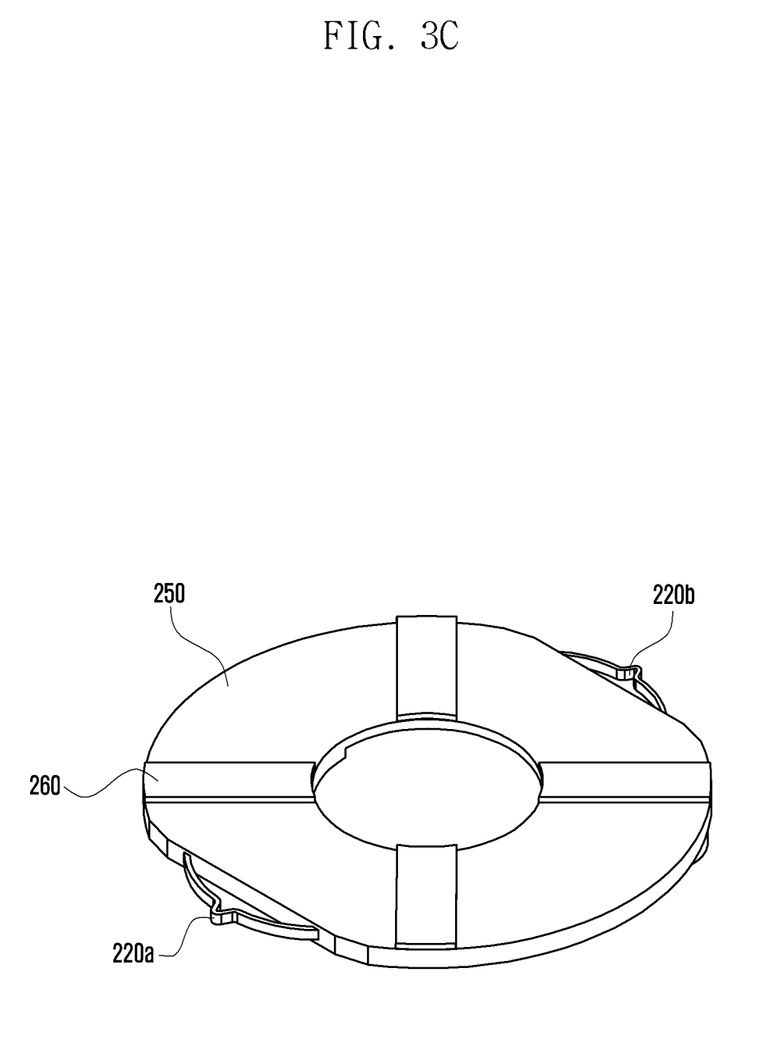
FIG. 3C is a bottom view illustrating a rotational support plate, according to an embodiment.

FIG. 3C is a bottom view illustrating a rotational support plate (i.e., the rotational support plate 140 of FIG. 1), according to an embodiment.

Referring to FIG. 3C, a lower part of the rotational support plate 140 includes a groove 250 and a protrusion 260 corresponding to the shape of connector 360 of the fixing support plate 150 illustrated in FIG. 3B.

When the rotational support plate 140 is combined with the fixing support plate 150, each protrusion 260 of the rotational support plate 140 may be formed by an individual displacement of 45 degrees from the connectors 360 of the adjacent fixing support plate 150. For example, if the rotational support plate 140 rotates to 45 degrees in the right or left direction, the rotational support plate 140 cannot rotate anymore because the connector 360 of the fixing support plate 150 limit any further rotation. Because the protrusion 260 of the rotational support plate 140 can replace the role of the trapping jaw 345 of the fixing support plate 150 in this manner, the fixing support plate 150 may not include the trapping jaw 345 in the protrusion 340 if the protrusion 260 is included under the rotational support plate 140.

Alternatively, the lower part of the rotational support plate 140 may omit a separate protrusion 260. For example, the thickness of the rotational support plate 140 may be formed according to a difference between the thickness of the fixing support plate 150 and the thickness of the connector 360.

Figure 4A:
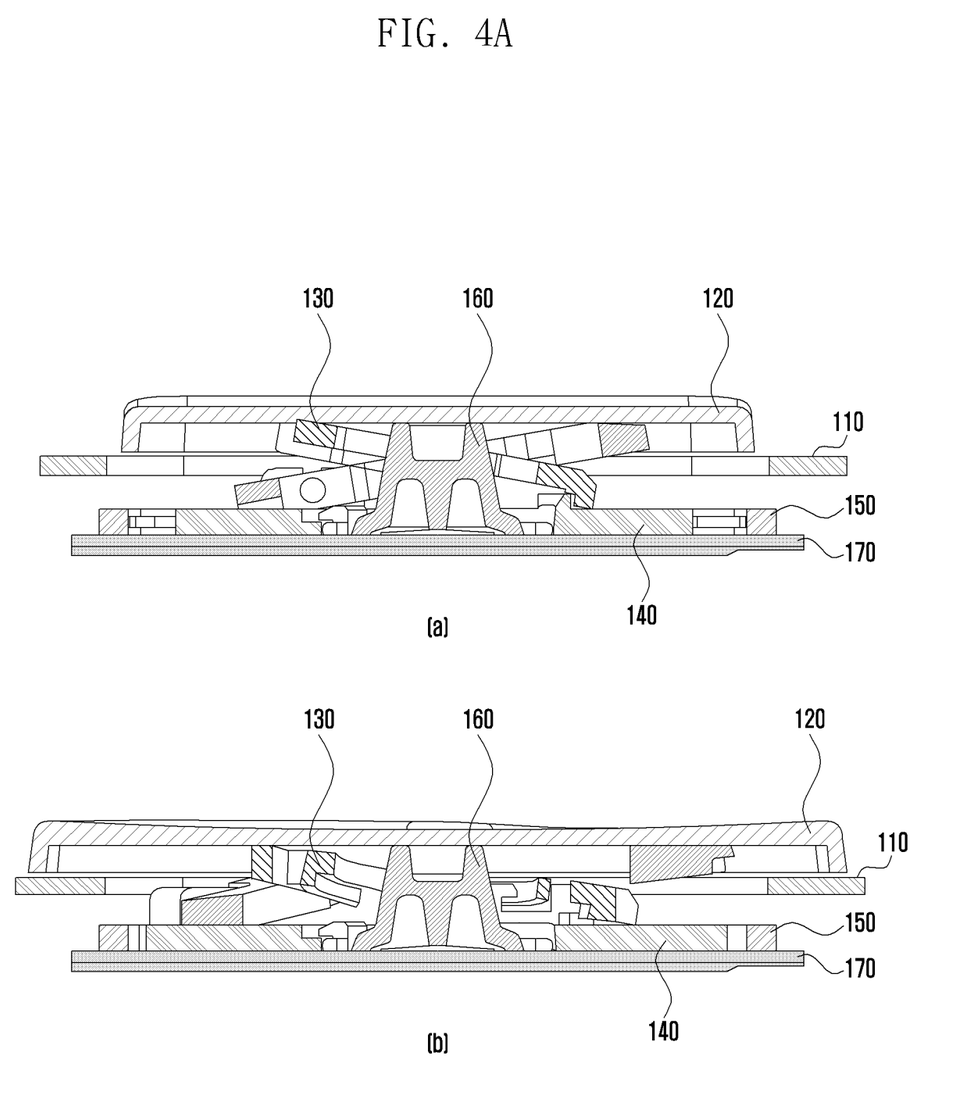
FIG. 4A is a cross sectional view illustrating a keyboard before and after a rotational movement, according to an embodiment.
Figure 4B:
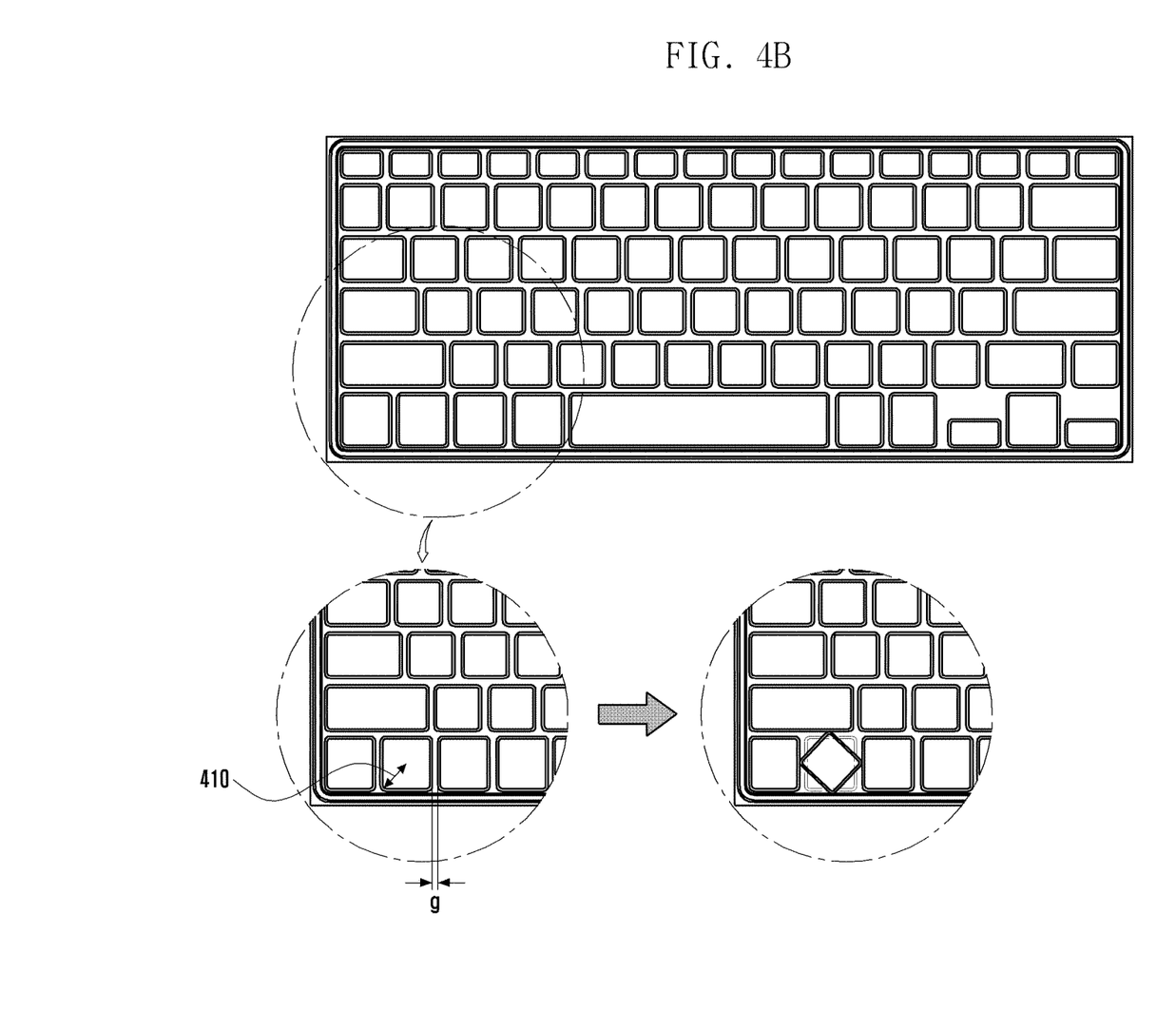
FIG. 4B illustrates a shape of a keyboard locked by moving a specific key of the keyboard, according to an embodiment.

FIGS. 4A and 4B illustrate performing a locking function in a keyboard, according to an embodiment.

Reference symbol (a) of FIG. 4A is a cross sectional view illustrating a keyboard in a state in which a key cap 120 of a specific key does not rotate, and reference symbol (b) is a cross sectional view illustrating a keyboard in a state in which a specific key is locked by rotating the key cap 120 to a predetermined angle.

FIG. 4B illustrates a shape of a keyboard locked by moving a specific key of the keyboard.

Referring to FIGS. 4A and 4B, if a pressure is applied to the key cap 120 in a state of not rotating the key cap 120, the key cap 120 can move up and down through the key cap hole of the housing 110. However, if the key is locked by rotating the key cap 120 to a predetermined angle, the key cap 120 is stopped by the housing 110 and cannot move up or down because the width of the key cap hole becomes narrower than the width of the key cap 120 in at least one area (i.e., area corresponding to a diameter) of the housing 110.

As shown in FIG. 4B, each key of the keyboard may be disposed by maintaining a predetermined distance g so that at least one key cap 120 of the keys can rotate in the right or left direction. For example, the distance g may be greater than 0.3 times of a distance 410 between the center of the key cap 120 and one of the corners of the key cap 120.

Because the keyboard can easily lock a specific key with the above method, a key lock function can be provided without changing a software setting to ignore an input of a specific key or without physically removing a key cap 120.

The key cap 120 of the keyboard may be configured to rotate when a force greater than 300 gf is applied and/or when an elevation movement of the key cap 120 is applied.

Figure 5:
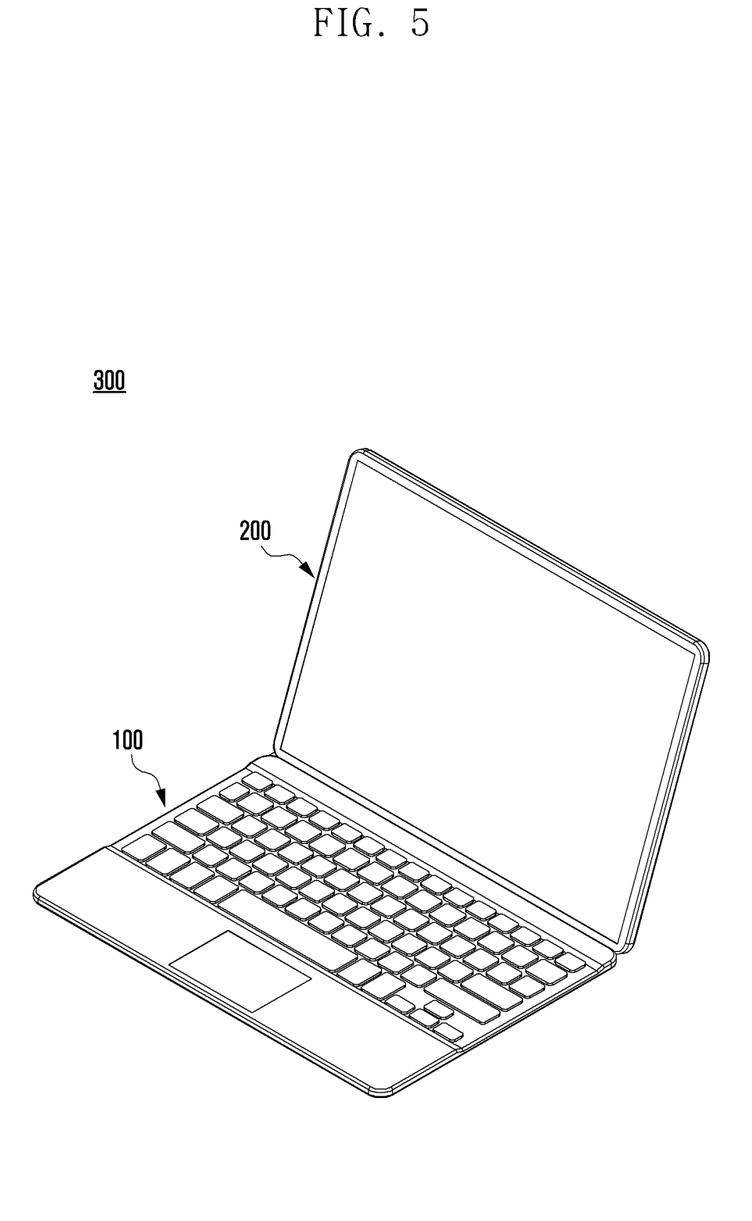
FIG. 5 is a perspective view illustrating an electronic device having a keyboard 100, according to an embodiment.

FIG. 5 is a perspective view illustrating an electronic device 300 having a keyboard 100 according to an embodiment.

The electronic device 300 includes a keyboard 100 and a display 200, and may have a structure such that the keyboard 100 and the display 200 can be folded by displacing each other.

The electronic device 300 may include a circuit board comprising a contact terminal, a key cap, a housing comprising at least one key cap hole configured to penetrate the key cap, an elastic support member configured to support the key cap for moving the key cap and to press the contact terminal while the key cap moves in a downward direction, a link configured to guide an elevation movement of the key cap by connecting a first end of the link to the bottom of the key cap, a rotational support plate configured to be connected to a second end of the link and to rotate on the center of the elastic support member; and a fixing support plate comprising a circular groove configured to internally accommodate the rotational support plate.

The electronic device 300 may include a rotational support plate and a fixing support plate at a lower part corresponding to each key cap included in a keyboard so that a lock function can be provided for each key included in the keyboard. Further, the lock function may be provided only for a specific key (e.g., a power key) by including the rotational support plate and the fixing support plate only at the lower part of the key cap based on user requirements. That is, some of the keys (i.e., one or more keys) on the keyboard may be configured with the lock function and the remaining keys of the keyboard may not be configured with the lock function.

According to an embodiment, a keyboard can lock or unlock a specific key conveniently with a simple operation of rotating a key cap and without having to perform a separate cumbersome operation to block an input invoked by pressing a specific key.

Embodiments of the present disclosure may be implemented as software including one or more instructions that are stored in a storage medium that is readable by a machine. For example, a processor of the machine may invoke at least one of the one or more instructions stored in the storage medium, and execute the one or more instructions, with or without using one or more other components under control of the processor. This allows the machine to perform at least one function according to the at least one instruction that has been invoked. The one or more instructions may include a code generated by a compiler (i.e., a command) or a code executable by an interpreter. The machine-readable storage medium may be provided in the form of a non-transitory storage medium. The term "non-transitory" means that the storage medium is a tangible device, and does not include a signal (e.g., an electromagnetic wave), however "non-transitory" does not differentiate between where data is semi-permanently stored in the storage medium and where the data is temporarily stored in the storage medium.

A method according to various embodiments of the disclosure may be included and provided in a computer program product. The computer program product may be exchanged as a product between a seller and a buyer. The computer program product may be distributed in the form of a machine-readable storage medium (e.g., compact disc read only memory (CD-ROM)), or may be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

Each component (e.g., a module or a program) of the above-described components may include a single entity or multiple entities. Additionally, one or more of the above-described components may be omitted, or one or more other components may be added. Additionally or alternatively, a plurality of components (e.g., modules or programs) may be integrated into a single component. In such a case, the integrated component may still perform one or more functions of each of the plurality of components in the same or a similar manner as they are performed by a corresponding one of the plurality of components before integration. According to various embodiments, operations performed by the module, the program, or another component may be carried out sequentially, in parallel, repeatedly, or heuristically. Additionally, one or more of the operations may be executed in a different order or omitted, or one or more other operations may be added.

While the present disclosure has been particularly shown and described with reference to certain embodiments thereof, it will be understood by those of ordinary skill in the art that various changes in form and details may be made therein without departing from the spirit and scope of the disclosure as defined by the appended claims and their equivalents.

What is claimed is:

1. A keyboard, comprising:
   a circuit board including a contact terminal;
   a key cap;
   a housing including at least one key cap hole configured to penetrate the key cap;
   an elastic support member configured to support the key cap for moving the key cap and to press the contact terminal while the key cap moves in a downward direction;
   a link configured to guide an elevation movement of the key cap by connecting a first end of the link to the bottom of the key cap;
   a rotational support plate configured to be connected to a second end of the link and to rotate on the center of the elastic support member; and
   a fixing support plate including a circular groove configured to internally accommodate the rotational support plate,
   wherein the key cap is configured to stop moving in the downward direction by the housing according to rotation of the rotational support plate.

2. The keyboard of claim 1, wherein the rotational support plate includes at least one elastic member at a side of the rotational support plate.

3. The keyboard of claim 2, wherein the fixing support plate further includes a plurality of grooves configured to accommodate the elastic member.

4. The keyboard of claim 1, wherein the rotational support plate includes a link holder at an upper side of the rotational support plate, and the second end of the link is configured to be connected to the link holder of the rotational support plate.

5. The keyboard of claim 1, wherein the rotational support plate includes a center hole corresponding to the elastic support member.

6. The keyboard of claim 5, wherein the fixing support plate further includes a protrusion configured to limit a rotational movement of the rotational support plate in the center hole of the rotational support plate.

7. The keyboard of claim 6, wherein the rotational support plate includes at least one part of a groove area corresponding to the protrusion of the fixing support plate.

8. The keyboard of claim 6, wherein the fixing support plate further includes at least one connector configured to connect to the protrusion of the fixing support plate.

9. The keyboard of claim 3, wherein adjacent grooves among the plurality of grooves of the fixing support plate are each displaced at angles of 45 degrees or 90 degrees in the center of the elastic support member.

10. The keyboard of claim 1, wherein an elastic member of the rotational support plate includes a plate spring.

11. The keyboard of claim 2, wherein the rotational support plate includes a plurality of elastic members, and the plurality of elastic members are formed at sides of the rotational support plate facing each other in an opposite direction.

12. The keyboard of claim 1, wherein the rotational support plate is configured to rotate by a force greater than 300 gram-force.

13. The keyboard of claim 1, wherein the key cap is configured to:
   rotate up to an angle of 45 degrees in a clockwise direction or a counter clockwise direction.

14. The keyboard of claim 13, wherein the key cap is configured to stop moving in the downward direction by the housing, if the key cap rotates to an angle of 45 degrees in the clockwise direction or the counter clockwise direction.

15. The keyboard of claim 1, wherein the key cap has a rectangular shape.

16. The keyboard of claim 1, wherein the housing further includes a plurality of key cap holes, and
   wherein each key cap hole maintains a specific distance to avoid contacting with other keys when the key cap rotates.

17. An electronic device, comprising:
   a circuit board including a contact terminal;
   a key cap;
   a housing including at least one key cap hole configured to penetrate the key cap;
   an elastic support member configured to support the key cap for moving up the key cap and to press the contact terminal while the key cap moves in a downward direction;
   a link configured to guide an elevation movement of the key cap by connecting a first end of the link to the bottom of the key cap;
   a rotational support plate configured to be connected to a second end of the link and to rotate on the center of the elastic support member; and
   a fixing support plate including a circular groove configured to internally accommodate the rotational support plate,
   wherein the key cap is configured to stop moving in the downward direction by the housing according to rotation of the rotational support plate.

18. The electronic device of claim 17, wherein the rotational support plate includes at least one elastic member at a side of the rotational support plate, and the fixing support plate further includes a plurality of grooves configured to accommodate the elastic member.

19. The electronic device of claim 17, wherein the key cap is configured to rotate up to an angle of 45 degrees in a clockwise direction or a counter clockwise direction.

20. The electronic device of claim 17, wherein the rotational support plate is configured to rotate by a force greater than 300 gram-force.

* * * * *